United States Patent [19]

Grunwald

[11] Patent Number: 4,565,430

[45] Date of Patent: Jan. 21, 1986

[54] OVERHEAD PROJECTOR

[76] Inventor: Peter H. Grunwald, Rheinstrabe 37-39, 6070 Langen, Fed. Rep. of Germany

[21] Appl. No.: 529,036

[22] Filed: Sep. 2, 1983

[30] Foreign Application Priority Data

| Sep. 2, 1982 | [DE] | Fed. Rep. of Germany | 3232639 |
| Oct. 28, 1982 | [DE] | Fed. Rep. of Germany | 3239890 |
| Nov. 12, 1982 | [DE] | Fed. Rep. of Germany | 3241956 |
| Apr. 15, 1983 | [DE] | Fed. Rep. of Germany | 3313697 |
| Apr. 15, 1983 | [DE] | Fed. Rep. of Germany | 3313699 |
| May 3, 1983 | [DE] | Fed. Rep. of Germany | 3316032 |

[51] Int. Cl.$^4$ ............................................. G03B 21/16
[52] U.S. Cl. ................................. 353/61; 353/66; 353/119; 353/DIG. 4; 353/94
[58] Field of Search .............. 353/65, 66, DIG. 3, 353/DIG. 4, DIG. 5, DIG. 6, 98, 38, 57, 61, 119, 122, 94

[56] References Cited

U.S. PATENT DOCUMENTS

| 2,767,611 | 10/1956 | Fitzgerald | 353/DIG. 3 |
| 3,459,475 | 8/1969 | Lucas | 353/38 X |
| 3,525,566 | 8/1970 | Altman | 353/DIG. 5 |
| 3,632,197 | 1/1972 | Shelton | 353/57 X |
| 3,733,121 | 5/1973 | Smitzer | 353/87 X |
| 3,922,079 | 11/1975 | Astero | 353/119 X |
| 4,156,561 | 5/1979 | Lucas | 353/38 |
| 4,206,984 | 6/1980 | Mueller | 353/61 |

FOREIGN PATENT DOCUMENTS 2747916 5/1979 Fed. Rep. of Germany ........ 353/66

Primary Examiner—Harry N. Haroian
Attorney, Agent, or Firm—Robert E. Burns; Emmanuel J. Lobato; Bruce L. Adams

[57] ABSTRACT

An overhead projector comprises a base, a hollow post extending up from the base and a projection head on an upper portion of the post. The projection head comprises a light source, an objective lens and a deflection mirror. A power supply unit housed in the post supplies power to the light source and to a ventilating fan inside the post between the power supply unit and the projection head. Openings in the post provide for circulation of cooling air by the fan over both the light source and the power supply unit. The power supply unit includes interchangeable input stages which can be plugged into a socket in the post to adapt the power supply unit to different voltages and currents. A slide or microfilm projector mounted adjacent the projection head projects on the base an image which is then re-projected onto a wall or screen by the projection head. For use at conferences, a conference table top is provided with a plurality of sockets into which the posts of overhead projectors can be plugged. Electrical contacts in the sockets engage contacts at the lower end of the post to provide current to the power supply unit. A reflecting Fresnel lens is preferably set in the base or the table top to reflect light rays from the light source to the objective lens.

28 Claims, 31 Drawing Figures

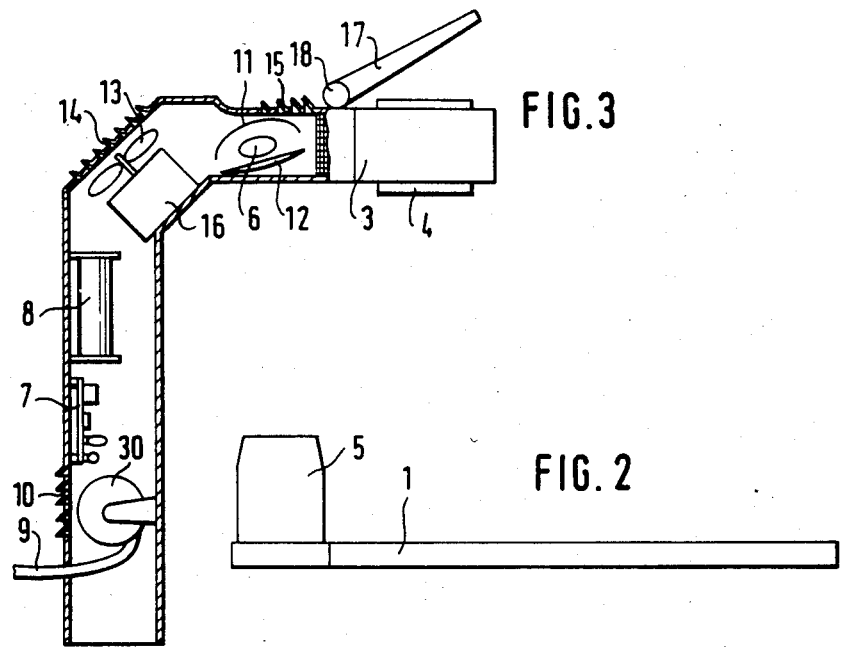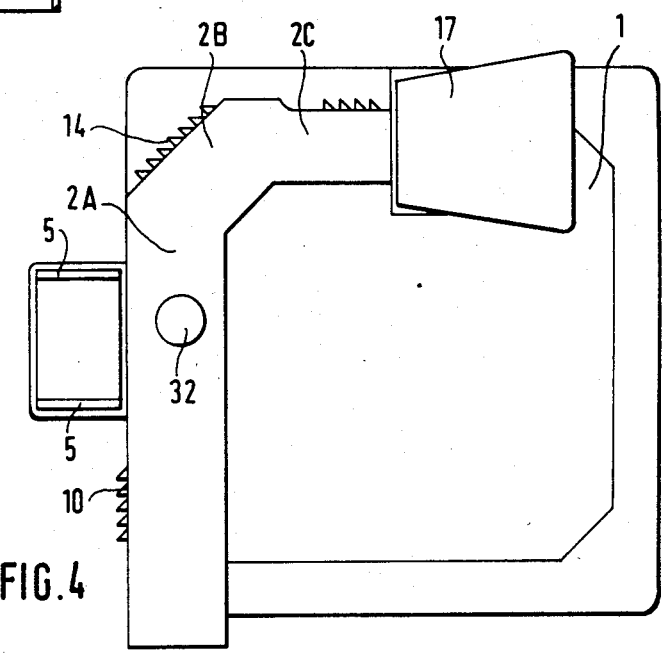

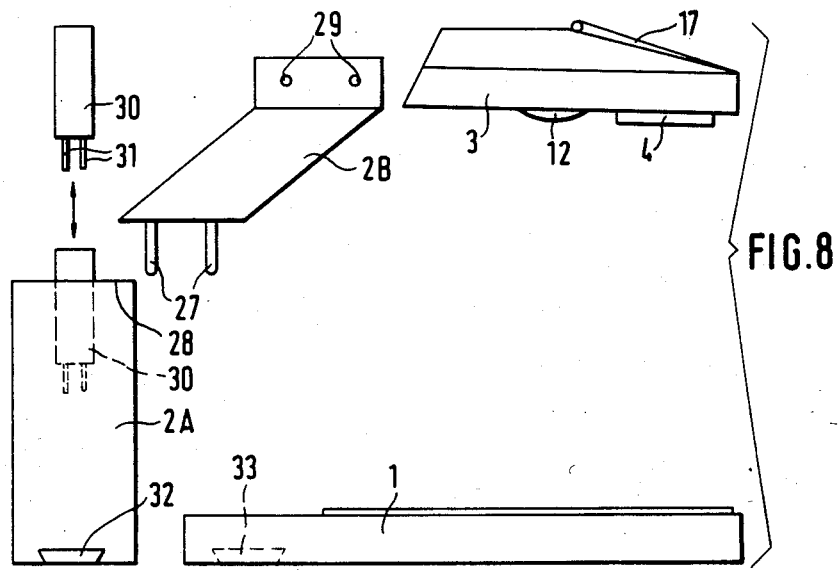
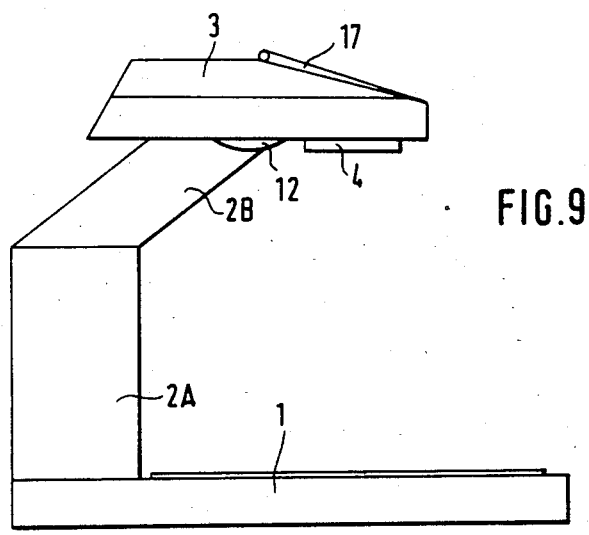

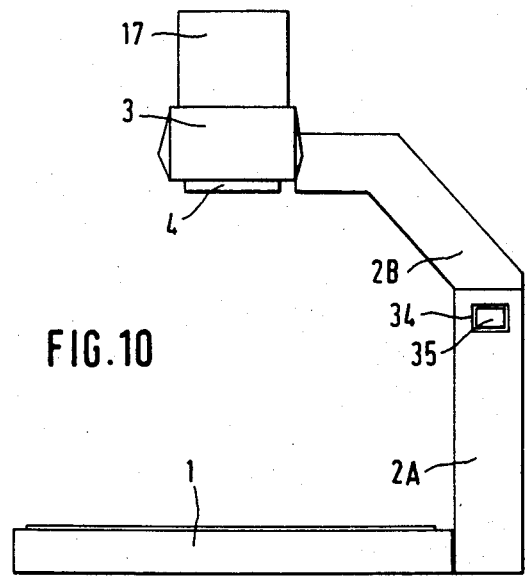
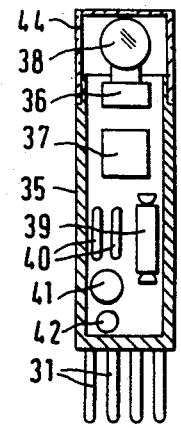
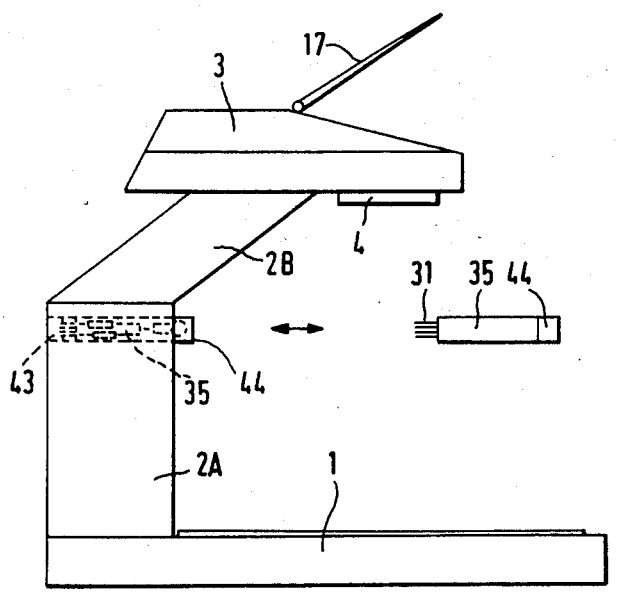

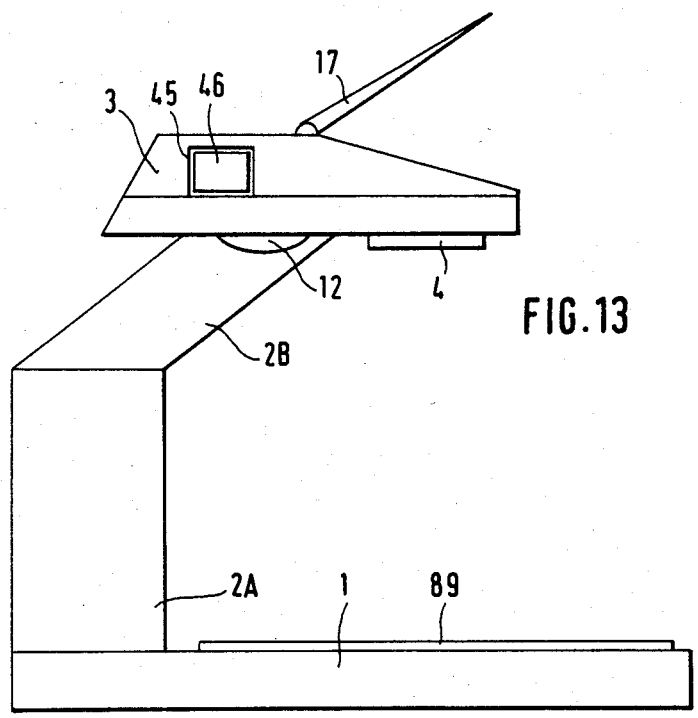
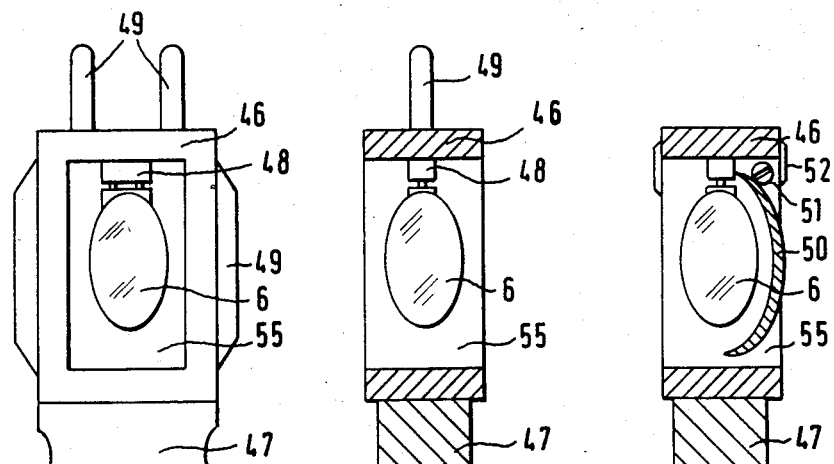
FIG. 13
FIG. 14    FIG. 15    FIG. 16

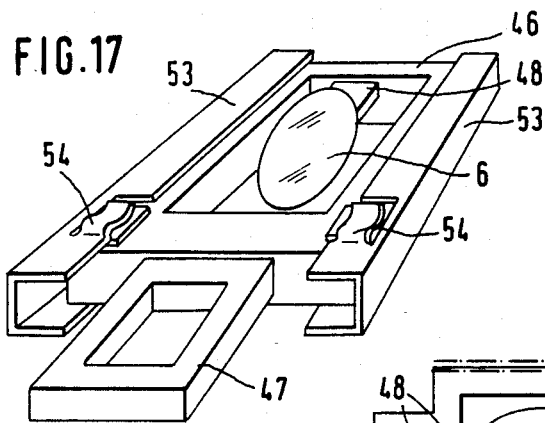
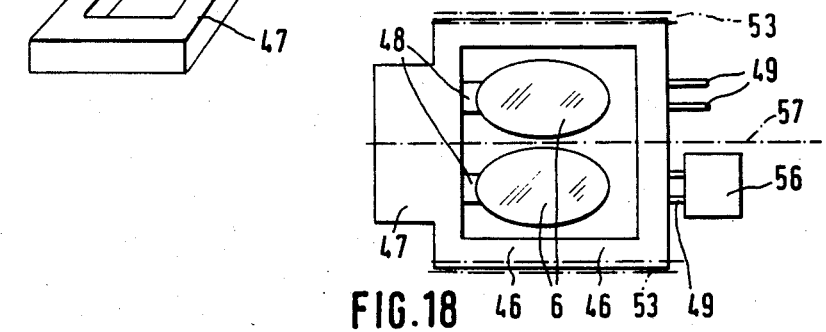
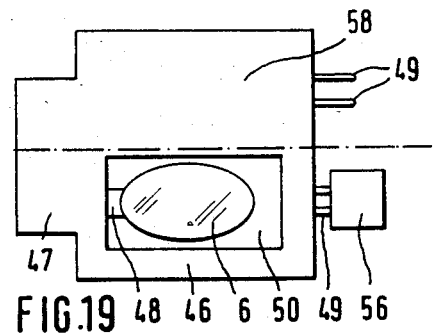
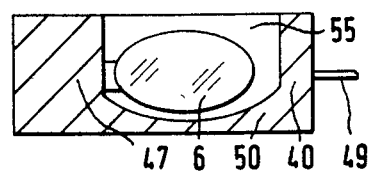
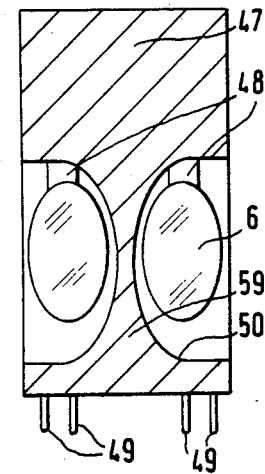

OVERHEAD PROJECTOR

FIELD OF INVENTION

The invention relates to an overhead projector comprising a foot on which there is mounted a post for a housing which accommodates a lamp and carries an objective lens and also comprises a power supply and a ventilator.

BACKGROUND OF THE INVENTION

Overhead projectors of this kind are produced by different manufacturers in a variety of types. These overhead projectors have a foot in the form of a plate on which the original copy which is to be projected is laid. Such plate is the support for a reflecting Fresnel lens. If transparent originals are laid on the lens they are diascopically projected. However, with this projector, non-transparent originals can be episcopically projected. On the edge of the plate, in general on a corner of the plate, there is mounted a post which carries a housing which on the one hand accomodates the light source comprising a lamp, convex mirror and a condenser and at the same time accomodates the objective lens. There are embodiments in which the power supply is accommodated in a casing or underneath the plate serving as a foot. However, this is disadvantageous because the dimensions of the apparatus are unnecessarily large and because it is necessary to provide a ventilator for cooling the power supply and another ventilator for cooling the lamp. Because of this, there are embodiments in which the power supply is accommodated in the housing that accomodates the light source and the objective lens. However, this has also been found disadvantageous because the weight of the housing is thereby considerably increased and hence the post and possibly a bracket between the housing and the post must be made particularly strong. In many cases, this housing is given a further weight increase in that, adjacent the objective for overhead projection, still a further objective for slide projection together with guiding and shifting means for the slides are accommodated in the housing. The strong design of the post is disadvantageous not only because the price and weight of the overhead projector are increased, but also because of the need of a very strong fastening of the post on the foot plate. This fastening must be made so fast because considerable moments produced through the weight of the housing, the arrangement of this weight laterally of the post and the considerable spacing of this weight from the fastening point act on the fastening. In general, the post does not have the desired rigid fastening but is prone to swing which allows the projection to be unclear and unsharp.

The requirement of a very rigid and strong fastening at the junction of the post to the housing has lead heretofore to making this fastening only rigid.

There are indeed also hinged fastenings of the post on the housing but only with overhead projectors in which the light source is underneath the writing plate. Such disdiascopically operating overhead projectors with hinged posts are used as portable apparatus, especially for taking on trips. Here the expense is driven higher if the post is to be free of swinging.

Also in the use of a projector on trips there is the problem that supply voltages are different in different countries. While 220 volt alternating current is standard throughout German, North America raises problems with 110 volt alternating current. There are also European countries with 110 and 130 volts and in other parts of the world direct current is used. As the usual commercial projectors are designed for a single voltage and for a single kind of current, it can happen to a lecturer that in another country, he cannot use the projector he has brought because there the electrical supply has a different kind of current or a different voltage.

SUMMARY OF INVENTION

The invention avoids these disadvantages. The invention is directed to the problem of finding a particular arrangment of the parts of an overhead projector so that it is smaller, handier, lighter and above all, of less volume for packing.

In accordance with the invention the power pack is received inside the post. In this manner, a very small type of construction is achieved. The projector is handier, lighter and has less volume.

With this construction it is advantageous for the power supply cable to exit from the lower portion of the post so that it no longer needs to pass through the foot.

It is particularly advantageous when a ventilator for cooling the lamp and/or power pack is arranged inside the post and when through the provision of at least one air inlet and one air outlet the post is formed as a cooling air channel. This construction brings the advantage that the weight of the overhead projector is reduced because the already present hollow post now serves as a cooling channel. The accommodation of the power pack and the ventilator inside the post brings the advantage that the weight of these parts is essentially more favorably arranged than in the housing accomodating the objective lens and the lamp. The weight of the power pack is now nearer the fastening point for the post on the foot so that the resulting moment is no longer so great. The location of the weight of the power pack is now more favorable because it lies vertically over the fastening point or at least approximately vertically over the fastening point. A further advantage is the more favorable thermic arrangement of the power pack which is no longer affected by the heat radiated from the lamp.

On account of this much more favorable arrangement of the power pack in the post it is possible to connect the post with the foot through a plug connection. This brings the advantage that for transport of the overhead projector the post can be removed in a simple manner and packed in a simplier and much better manner. The plug connection is especially simple as it is merely a mechanical connection and no electrical connecting parts are in any way necessary. This embodiment has the further advantage that feet of different kinds can be used for such overhead projector. Thus for example the foot can be a plate serving as a writing plate. However, the foot can also have an angular or U-form. If the foot is formed as a writing plate, the connecting means for the post is located in the middle of one side of the writing plate. If the foot is an angle, the mounting means for the post is located in a middle portion of one side of the angle. On the otherhand, if the foot has a U-form the fastening means for the post is preferably in the middle of the region of the middle shank.

A further possibility is that the foot is in the form of a writing table or other work table.

For travel, it is expedient to provide fastening means for the post on the foot so that during transport all parts of the overhead projector are secured to one another and form a unitary whole. This fastening means can be magnetic with which the post is fastened to the foot during transport.

It is especially advantageous when the post comprises two interfitting parts disposed at an obtuse angle to one another, of which the lower part accomodates the power pack and the upper part the lamp while the free end of the upper part carries the objective lens holder.

A form that has proved to be especially advantageous is that the post comprises three parts joined with one another in obtuse angles of which the lower part accommodates the power pack, the middle part the ventilator and the upper part the lamp with its free end carrying the objective lens holder. In this manner an especially favorable distribution of the weight of the individual parts is obtained and, at the same time also, an especially favorable and expedient cooling of the individual parts. While the air flowing through the power pack flows over a different branch from the cooling air for the lamp, the air flow in both branches is produced by one and the same ventilator.

With this arrangement it is advantageous for the air outlet to be arranged on the outer side of the middle part of the post.

In order to adapt the overhead projector for the projection of different originals, it is advantageous when the essentially vertical part of the post is telescopic and is provided with means for varying the length of the post. It is then possible, in the instruction of physics for example, to project equally well indivdual sheets placed on the table, thick books placed on the table and even physical experiments with apparatus in a plane much above the table plane.

In order to adapt the projector for any usual supply voltage it is advantageous to form at least the input stage of the power pack as an interchangeable part.

In this manner it is possible to adapt the projector to any supply voltage merely by interchanging a part of the projector. This interchange is best effected by providing a plug-in part. If, in the country where the projector is to be used, there is a different supply voltage, it is simple to pull out the input stage of the projector and replace it by another input stage which corresponds to the voltage of the country. This is a very simple procedure which anyone can carry out without difficulty. It is thus expedient to form the input stage of the power pack as a plug-in part comprising a plug which is insertable in a socket in the power pack, in particular when the input stage of the power pack is packaged in a special housing which is smaller than the housing of the power pack or projector.

It is advantageous when the housing of the input stage of the power pack has the form of a cylinder or parallelepied because a housing of this kind is easy to hold and light to handle.

The housing itself gives the user protection against disturbing such parts as carry voltage upon inserting the input stage of the power pack. It is hence expedient when the housing of the projector has an opening for insertion of the housing of the input stage and when the housing of the input stage has a part projecting from the housing of the projector. Then, the projecting part of the housing of the input stage can be gripped with the fingers of a hand and drawn out of the housing of the projector and interchanged with a like housing of another input stage for another voltage or another kind of current. For the easy handling of the housing of the input stage it is expedient when the part of the housing of the input stage opposite the plug is formed as a hand grip.

This input stage can be provided with a plug with different contacts which are wired with one another so that some pins or contacts are blind while one or more particular pins or contacts are connected with one another so that the supply voltage is conducted by particular pins or contacts to particular parts of the following stage or to particular subsequent stages of the power pack. Advantageously the plug-in input stage comprises electronic parts serving to change the voltage. Thus it is expedient when at least one resistance is arranged in the housing of the input stage. It is also advantageous when the housing of the input stage contains a fuse. This is then easily interchangeable when the housing of the input stage is pulled out of the projector.

In order to indicate whether the right input stage is inserted, it is advantageous when at least one lamp is provided in the housing of the input stage and when the side of the housing opposite the plug and thus that side which is used as a hand grip is made translucent. Different electrical circuits can be constructed which permit the lamp to be lighted either when the correct input stage is selected or when an input stage is inserted for the wrong supply voltage. In the case in which the lamp is lighted when the correct input stage for the supply of voltage is inserted, the transluent part of the housing can, for example, be formed of a green-colored light transmitting material and the lamp can be used as "ready" lamp. If, on the otherhand, it is to be indicated that the right input stage has not been selected, the translucent material can, for example, be red and the lamp is so connected that the lamp is lighted when voltage is too high or too low for operation of the electric power pack. There is also the possibility of providing two lamps and of forming the housing for these lamps of material of different colors, for example red and green. It is then evident from the lighted color that voltage is present and which voltage is present, namely one suitable for operating the power pack or one which is unsuitable for operating the power pack.

When the post or carrying arm is divided, it is advantageous when its parts are connected with one another by plug-in connections and when the input stage is inserted in a socket provided in one end of one part. In this case it is advantageous when part of the post or arm which receives the input stage is provided with a window through which the input stage or its housing can be seen in order to make visible either a legend indicating the voltage or a voltage-indicating lamp.

With a projector is happens now and then that the lamp of the projector fails and must be replaced by a new lamp. If the projector has been in use for sometime, the lamp is very hot and can be changed only with accessory means. Many such means are known, beginning with a cloth with which a person grips the lamp, to ejecting devices with which the hot lamp is ejected and falls into the housing of the projector where it is allowed to lie until it is cool. All of these auxiliary devices are extremely unsatisfactory.

In order to avoid these disadvantages it is expedient when the lamp together with its socket is accommodated in a frame which is slidable in and out through an opening of the housing on guide rails arranged in the housing and carries electrical contacts which in the inserted position of the frame engage contacts arranged inside the housing.

With this projector the frame together with its lamp is withdrawn through the opening in the housing and interchanged with another frame. When the lamp has cooled, it can be removed from its socket and replaced by a new lamp. In this manner the changing of a hot defective lamp with a new lamp can be effected with only two hand frames. This changing of the lamps is without danger as the operator can not be burned. Advantageously a crossbeam of the frame is formed as, or carriers, a handle or hand grip. Through the withdrawl of the frame with the defective hot lamp it is achieved that this is no longer inside the projector housing.

Advantageously the crossbeam of the frame opposite the hand grip or handle carries contact pins. Another possibility of providing electrical connections is that at least one crossbeam of the frame carries areas or surface elements of conducting material as contact faces.

Especially in the latter case it is advantageous when the guide rails for the frame inside the housing of the light source are conductive and form the counter contacts over which the current for energizing the lamp is conducted to the contact areas on the cross beam of the frame.

It is advantageous when the reflector is arranged in the frame adjacent the lamp. Then not only the lamp but also, at the same time, the reflector will be interchanged.

It is especially advantageous when means is provided for adjusting the relative positions of the lamp and reflector in the frame. Then the adjustment of the relative positions of the lamp and reflector can be carried out outside the projector, for example in the factory. Then such a frame is a very inexpensive construction part which, with the use of an inexpensively produced reflector, can be installed as a unit in the spare part handle.

The invention offers a further very advantageous possibility for lamp changing in that two lamps are arranged next to one another or behind one another in the frame window. Changing the lamp is effected in the manner that the frame is withdrawn from the projector housing turned 180°, and then reinserted in the projector. The arrangement of the two lamps next to one another leads to a wide but very thin frame while the arrangement of the two lamps behind one another in the window frame leads to a compact but also thick frame. According to the spatial characteristics of the projector either of these possibilities can well be used.

It is also advantageous here when reflectors for both lamps are arranged in the frame. In the case in which the two lamps are arranged next to one another in the frame window, then on each side of the frame the backside of a reflector and next to it a lamp are seen. In case the two lamps are arranged behind one another in the window of the frame, the reflector lies between the two lamps. In this case, it is expedient when the two reflectors are formed on opposite sides of a body. This body lies between the two lamps. Advantageously the frame and the body with the two reflectors can be produced integrally as one piece. It is advantageous when the hand grip or handle is heat insulated from the frame.

When there are two lamps in one frame it is expedient when the electrical counter contacts are arranged assymetrically to the projection of the geometric axis or median plane so that there is always one lamp in the projector energized while the other lamp is on standby as a replacement lamp.

The accommodation of the power supply in the post and the manner of assembly of the projection head on the post make is possible to develop a projector which is extendable to a universal apparatus with which not only overhead projection originals and slides but also microfilms can be projected and further extendible so that while slides and microfilms are projected on the wall they can, at the same time, be read on a table plate so that the lecturer during projection of the slides and microfilm does not need to turn his head between the audience and the projected picture.

In accordance with the invention the parts of the projector can be assembled as prefabricated parts in that the post is attached to the base plate or a housing arranged under the base plate and the projection head is attached to the post by means of quick couplings or socket connections.

One possibility of carrying out the invention is that a projection head with an overhead projection objective attached or attachable to the post by means of a socket connection or a quick coupling is interchangable with another with a microfilm projector or a slide projector. Another possiblity is that on the projection head with an overhead projection objective, a projection head with microfilm projector and/or slide projector is additionally attachable by means of a socket connection or a quick coupling.

It is thereby possible with one in the same apparatus to project all three kinds of originals (overhead-sheet, slide microfilm). It is hereby attained that not only is there provided a very ecconomical projection possibility for these three kinds of pictures but also that the space requirement that the lecturer needs is substantially reduced. Through the construction of this apparatus in knock-down form it is possible for the user to purchase individual parts one after another. It is of special interest that there is provided in the projection head a microfilm projector of which the path of rays can be projected on the base plate and also on a wall surface.

It is thereby attained that the still picture projector is at the same time microfilm reading apparatus which moreover has the advantage that it can project on a white sheet of paper which can be written on during projection of the microfilm. The microfilm reader is thus given the possibility of sketching on the white paper from the microfilm. This is an advantage given by this arrangement of the microfilm projector in the projection head and is not dependent on the principle of unit construction. This advantage occurs in like manner whether the microfilm projector is accommodated in a projection head fixed on the post or a projection head which is interchangably attached to the post.

A quite similar advantage is attained when the path of rays of the slide projector can be directed on the base plate and also on a wall surface. Also here, the slide projector can be used as a viewing apparatus and it is possible with this viewing apparatus, in contrast to the conventional viewer, to sketch on a sheet of paper or on a film or other object so that it is possible to sketch the projected picture on the object. Also this advantage does not depend on the unit construction but as in the case of the microfilm reader is independent on whether the projection head is fast on the post or is interchangably attached to the post.

There are particular advantages for the microfilm projector and the slide projector of which the rays can be projected on the one hand on the base plate and on the otherhand on a wall when the ray path is directed simultaneously on the base plate and also on the wall surface. Then the projected picture of the microfilm or slide is visible by the lecturer on the ground plate and for the audience the picture can be seen on the wall. A lecturer sitting in front of the audience does not need to turn his head between the picture projected on the wall and the audience, he needs only to adjust his direction of site through a small angle in order to look at the projected picture on the base plate and then at the audience. To perform this simultaneous projection it is expedient when a hinged mirror, a mirror movable in the ray path, a partially transparent mirror or a ray dividing partially reflecting prismatic body is arranged in the ray path of the microfilm projector and/or the slide projector. Through the mirror or the partially reflecting prismatic body which divides the ray beam it is possible to project the picture on the base plate as well as on the wall. If the mirror is hinged or is movalbe into the ray beam the picture can be projected either on the base plate or on the wall as is also possible when the microfilm projector or the slide projector is mounted on the projection head on the post by means of a tiltable device.

Structurally, it is advantageous when the microfilm projector, the slide projector and the overhead projection objective are accomodated in special projection heads which comprise like coupling parts or socket connection parts.

Special possibilities arise when on the microfilm projector head, on the slide projector head and/or on the overhead projection head there is additionally mounted a quick coupling part which is also mounted on the post. Then for example the overhead projection head and additionally the microfilm projector head can be mounted on the post. It is thereby possible that the picture of the microfilm can be displayed on the base plate and through the overhead projection head can be projected on the wall. Then a lecturer is given the possibility to sketch and write in the picture of the microfilm whereby these drawings and writing appear projected on the wall surface whereby the listeners and spectators can follow the developement of the drawing and the writing. The same is true for the projection of a slide when the slide projector head and the overhead projector head are simultaneously mounted on the post.

The object of the invention can be further developed in that there is provided a slide projector a housing of which is supported on the base plate or extends beyond the base plate and is supported on the supporting surface and has electrical contact pins which are inserted in openings in the carrying arm behind which there are contact clips.

This projector is easily disassembled for stowing the carrying arm, the projection head and the slide projector in the base plate and all of these parts are easily stored in a pouch or a small trunk. The particular advantage of this projector is that the overhead projection head and the slide projector are energized by the same power slide which is accomodated in the carrying arm.

As blowers with low voltage motors are used for cooling the light source of the overhead projection head as well as for the cooling of the light source of the slide projector the supply voltage is found only in the carrying arm while all contact pins which are plugged into the carrying arm whether they are contact pins for the projection head or are contact pins for the slide projector receive only low voltage. Further advantage of this projector is that it can be produced with very small dimensions in particular for a writing plate format of 15 cm×15 cm or 10 cm×10 cm. It will be understood that for this minaturization of the writing plate all other parts must be minaturized, i.e. must be made much smaller than usual. It is hence expedient when in the light source for the overhead projection and/or for the slide projection direct current motors are used.

For the arrangement of the slide projector it is expedient when the base plate is extended over the writing surface as a support surface for the slide projector.

It is advantageous when the carrying arm has at its lower end contact openings for the contact pins of the slide projector and has at its separate end or on the upper end contact openings for the contact pins of the projection head.

It is advantageous when the spacing of the contact openings for the slide projector and the projection head are different because then laymen in particular children, cannot insert the contact pins of the projection head or of the slide projector in the wrong openings.

For the mounting of the overhead projection head there are three preferred possibilities:

either the projection head is mounted laterally on the carrying arm in which case it is expedient for the carrying arm to have a projection below the upper contact openings and the projection head fits this form so that it is better supported on the carrying arm, or the projection head has substantially vertical downwardly extending contact pins which are inserted in the upper end of the carrying arm from above, or the contact pins on the projection head are arranged at a downwardly inclined angle.

The arrangement of the power supply in the post as well as the possibility of setting the post on the foot opens the possibility of creating a useful work table in particular for conferences where each person sitting at the table can use an overhead projector without such overhead projector requiring much room and without interferring with the view and with the work surface.

This is accomplished in that at least one holder is set in the table top in which the post for an overhead projector objective and its appurtenant deflection mirror is inserted.

In this manner there is provided a construction form for the work table in which only the posts of overhead projectors are inserted in holders which are set in the table top. The post of an overhead projector takes very little room. It scarsely interfers with the view. Also, it occupies very little work space. As the holders for the posts can be provided adjacent each workplace, each attendant at the conference is able to have on the work table an overhead projector adjacent his work place and with this to transmit his graphic exhibits to all participants of the conference. However, there is also the possibility that holder for the post of an overhead projector objective is arranged between each two workplaces on the table. With this arrangement, two conference participants work with one overhead projector.

As the post for the overhead projector objective is insertable into and removable from the holder in the table top, each conference table can be provided with the number of overhead projectors required for the conference participants. There are thus never more overhead projectors than conference participants on the work table.

It is advantageous when in the holder, and in the insertable part of the post, electrical contacts are provided. Then there is one power cable for the individual connections for the light sources of the overhead projectors underneath the conference table and not on the conference table, which would be the case if conventional overhead projectors were used on the conference table.

It is advantageous when in the upper surface of the table top adjacent the holder there is provided a recess to receive a reflecting Fresnel lens. Then the Fresnel lens can be arranged flush with the upper surface of the table top so that the work of the conference participant on the overhead projector is always on one plane, namely the plane of the table top.

When the backside of the reflecting Fresnel lens is of the same material as the table top upper surface there is a possibilty that at each work place of the conference table on which a post for an overhead projector objective is inserted there is a reflecting Fresnel lens in the table top upper surface, while at other work places at which no stand for an overhead projector is inserted, the plate with the reflecting Fresnel lens is turned over so that now the material of the table top upper surface on the backside of this plate is turned upwardly.

It is advantageous when the light source is directed not only on the reflecting Fresnel lens but also on the table top surface adjacent the reflecting Fresnel lens. The light source thereby serves not only for the overhead projection but also at the same time illuminates the work place.

At a conference it is usual that the conference participants sit at least partially opposite one another. In this case, it is expedient when each post carries two objectives and two deflection mirrors which are directed in other or opposite directions. In this manner it is attained that one overhead projector will project in two directions namely for example on two opposite walls of the conference room. This has the advantage that when the conference participants sit in two opposite rows, the participants in each row can equally well see the projected picture without needing to turn their heads.

BRIEF DESCRIPTION OF DRAWINGS

The nature objects and advantages of the invention will be more fully understood from the following description of preferred embodiments shown by way of example in the accompanying drawings in which:

FIG. 2 is a side view of the writing plate of the projector after removal of the post carrying the projection head;

FIG. 3 is a vertical section through the post;

FIG. 4 is a plan view of the overhead projector of FIGS. 1 to 3 arranged for transport;

FIG. 8 is an exploded view of a projector with a sectional post and support arm with the input stage of a power supply insertable in one section;

FIG. 9 is a side view of the overhead projector of FIG. 8 assembled;

FIG. 10 is a schematic front view of an overhead projector in the carrying arm of which the input stage of a power supply is insertable;

FIG. 11 is a side view of the projector shown in FIG. 1;

FIG. 12 is an enlarged sectional view of the input stage of the power supply.

FIG. 13 is a schematic side view of a projector with an insertable lamp;

FIG. 14 is a view of the lamp carrying frame;

FIG. 15 is a longitudinal section through the frame;

FIG. 16 is a longitudinal section through another embodiment of the frame with a reflector and with contact areas on the sides;

FIG. 17 is a schematic perspective view of a light carrying frame and guide channels in which it is recieved;

FIG. 18 is a schematic view of an embodiment of a frame with two lamps arranged alongside one another;

FIG. 19 is a view of another embodiment of a frame for two lamps with two reflectors in side by side arrangement;

FIG. 20 is a cross section through the light frame of FIG. 19;

FIG. 21 is a longitudinal section through a frame for two lamps arranged one behind the other;

DESCRIPTION OF PREFERRED EMBODIMENTS

Figure 1:
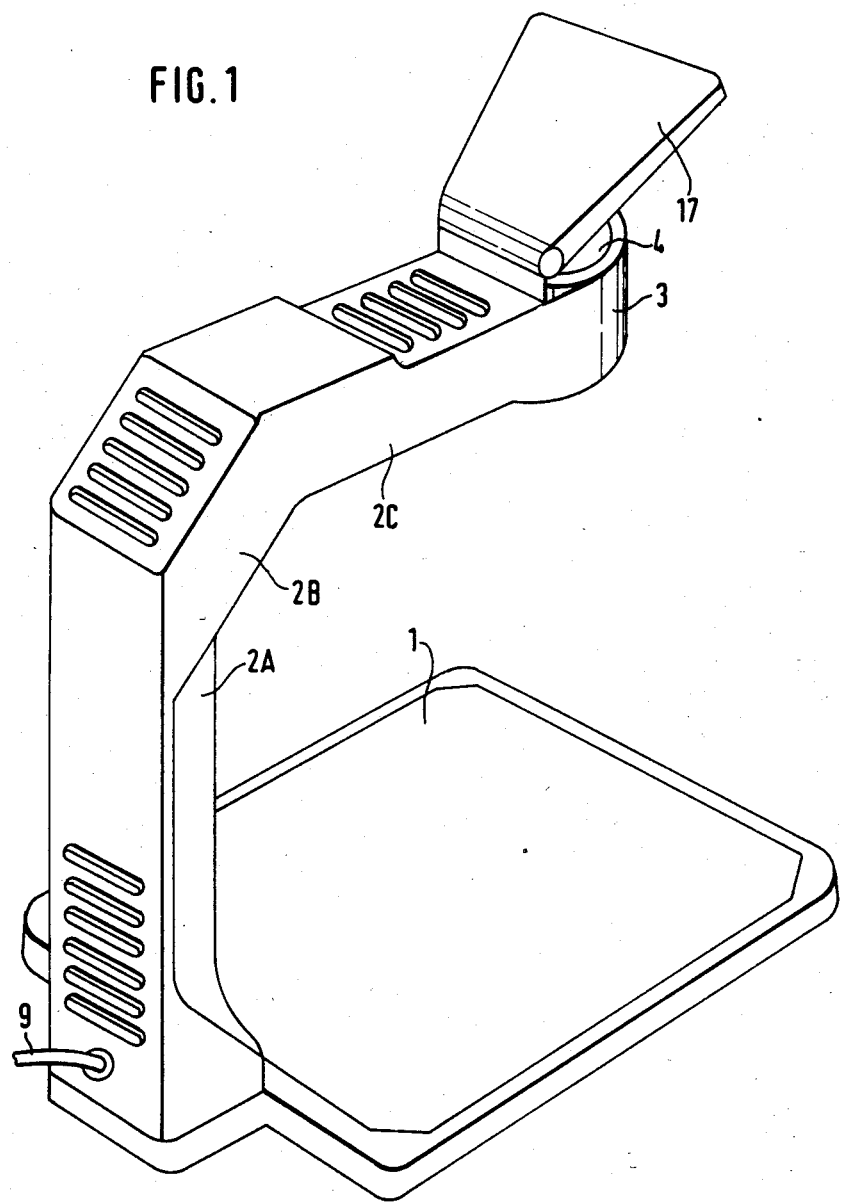
FIG. 1 is a schematic perspective view from behind of a projector in accordance with the invention.

The overhead projector shown in FIG. 1 has a very flat writing plate 1. In the middle of one side of the writing plate 1 there is mounted a post 2 which carries a projection head 3 serving as the objective carrier with an objective lens 4. Post 2 comprises an essentially vertically extending part 2A, a substantially horizontal extending part 2C and a mid-section 2B connecting these two parts. The post is made of a tube of rectangular cross section. A fastening device for mounting the post comprises two flat iron pieces 5 somewhat tapered at their ends and forming the sides of a U-shaped member of which a middle portion is secured to the writing plate 1. The tube-form post 2 is shoved down over the two side portions 5 so that the outer broad sides of the sides engage the inner surfaces of the small sides of the post 2 while the side edges of the sides 5 engage the inner surfaces of the broad sides of the post 2. In this manner there is realized a very simple attaching device which, however, is fully adequate. However, this attachment can be realized in other ways.

Inside the post 2 in the vertical portion 2A there is accommodated part of a power supply unit which converts the line current to a current suitable for feeding a lamp 6 mounted in the horizontal portion 2C of the post. This power supply includes a transformer 7 and a double coil 8. It may also include other elements such as capacitors, diodes, voltage regulator, filter and transistors. A power supply cord 9 extends from a lower portion of the vertical part 2A of the post. Moreover, in the lower portion of the post there are provided air inlet openings 10 for cooling the part of the power supply which is lodged in the post. The vertical post-part 2A can be telescopic so that its height is adjustable to vary the distance of the projection head 3 from the base 1.

A light source accommodated in the horizontal part 2C of the post comprises the lamp 6 a reflector 11 and a condenser 12. The latter is preferably arranged in a hinged socket so that it can be swung out of the way to permit changing the lamp.

In the connecting part 2B of the post between the vertical part 2A and the horizontal part 2C there is a ventilator or fan 13 which draws air from the post-part 2A as well as from the post part 2C and discharges it through outlet slits 14 in the upwardly directed side of the post part 2B. So that air for cooling the lamp 6 can enter the horizontal part 2C of the post, air inlet slits 15 are provided adjacent the lamp. The fan 13 is driven by an electric motor 16 supplied with power of suitable voltage from the power supply unit housed in the hollow post.

The objective carrier 3 mounted on the end of the horizontal post-part 2C carries the objective 4 and a deflection mirror 17. The mirror is mounted by means of a hinge 18 so that it can be swung down to a favorable position for transport as illustrated in FIG. 4.

In order to secure the post 2 and the objective carrier 3 on the writing plate 1 during transport the writing plate 1 is provided with suitable fastening means. These can for example comprise magnets arranged underneath the upper face of the writing plate when the post 2 and objective carrier 3 are made of ferromagnetic material.

Figure 5:
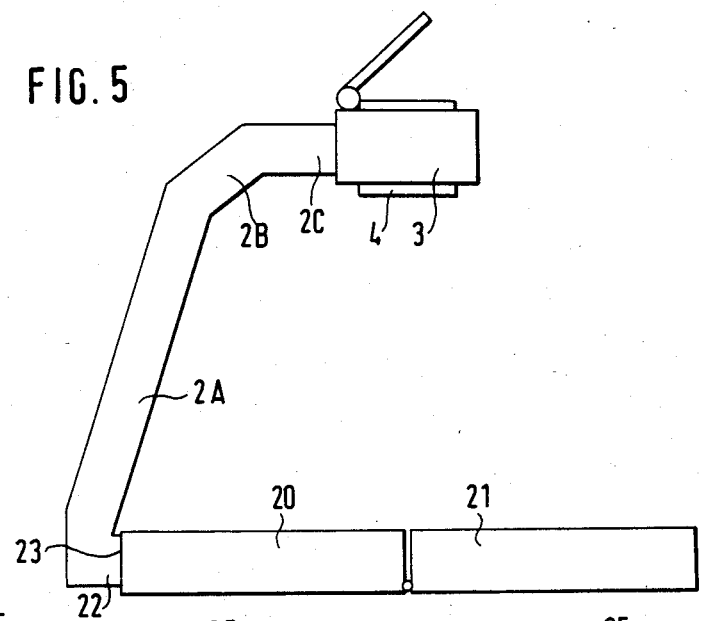
FIG. 5 is a schematic side view of another embodiment of an overhead projector with a writing plate which at the same time is a transport case.
Figure 7:
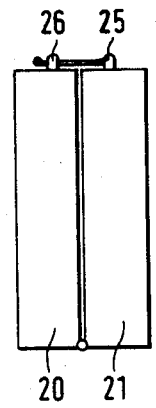
FIG. 7 is an in view of the case in closed condition.
Figure 6:
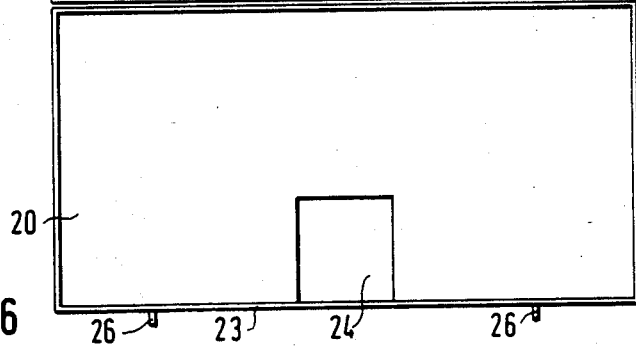
FIG. 6 is a plan view showing the post and projection head in the case.

In FIGS. 5 to 7 there is shown another embodiment of an overhead projector in accordance with the invention. In these Figures like parts are designated by the same reference numerals as in FIGS. 1 to 4. In FIGS. 5 to 7 the writing plate is formed as a transport case comprising two parts 20 and 21 hingedly connected with one another. While in the embodiment of FIGS. 1 to 4 the post 2 is slipped down over the fitting 5 provided on the base plate, the post 2 of the embodiment of FIGS. 5 to 7 has at the lower end of the essentially vertical post-part 2A a horizontally extending projection 22 which extends through an opening in the wall 23 of the part 20 of the case and fits into a socket 24 provided in the case. For transport of the projector the post 2 and the objective carrier 3 with objective 4 are placed in the part 21 of the case as seen in FIG. 6 whereupon the case can be closed as illustrated in FIG. 7 with the part 20 serving as a cover. The case can be locked in closed position by means of hinged latches 25 with locks on one side and pins 26 on the other side which are received in openings in the latches 25.

The post 2 can, at the same time, serve as a hand grip for carrying the projector, and as storage means for the electrical supply cord. As seen in FIG. 3 there is provided inside the post an automatic reel 9A for the electrical supply cord 9.

Suitable control elements are mounted on the post 2 including an on-off switch and also a switch for the motor actuation of the zoom objective and actuating switches for a motorized sharp focusing device and possibly for a motorized lamp changer.

Suitably in the writing plate there is a built-in Fresnel lens protected by a shield. In the embodiment in which the writing plate is formed as a two-part receptacle, the two-part assembled Fresnel lens is suitably protected by a cover plate.

The overhead projector illustrated in FIGS. 8 and 9 has a two-part post. These two parts 2A and 2B are assembled by means of pins 27 on part 2B fitting into openings in the end face 28 of the post-part 2A. The projection head 3 is provided with pins which fit into openings 29 in the post part 2B. These pins are not visible in the drawing because they are on the far side of the projection head 3. Behind the openings 29 there are electrical contacts which make contact with the respective pins of the projection head 3. In the upper end face 28 of the post-part 2A there is removably inserted the input stage 30 of the power supply unit of which pins 31 inside the post-part 2A, are received in an appropriate socket of the power supply unit. This socket is so arranged that a part of the input stage 30 projects up above the end face 28 of the post so that this part can be gripped with the fingers to pull out the input stage and possibly exchange it for another. On the lower end of the post part 2A there is a perpendicular dove-tail form bar 32 which is insertable in a dove-tail opening 33 of the base plate to mount the post on the base plate. FIG. 9 is a side view showing the parts shown in FIG. 8 assembled to form a projector ready for use. The input stage 30 of the power supply unit is inside the post 2A, 2B.

FIGS. 10 and 11 show another embodiment of an overhead projector in accordance with the invention. Like parts are identified by the same reference numerals as in the previously described embodiment. In the post-part 2A which houses the power supply unit there is an opening 34 to receive the housing 35 of the input stage of the power supply unit. On the end opposite the pins 31, the housing 35 has a translucent cover 44 behind which there is a lamp 38 in a socket 36. This lamp is supplied current through a control circuit 37. The control circuit 37, for example provides current to light the lamp 38 when the input stage is not proper for the voltage of the supply line. In this case the cover can be red. Alternatively, the control circuit 37 can supply current to light the lamp 38 when the input stage is correct for the line voltage. In this case the cover 34 can be green. If desired, there can be two lamps of which one is lighted when the input stage is correct for the line voltage and the other is lighted when it is not. The housing 35 of the input stage also contains a fuse 39, two resistances 40, a transistor 41, and a capacitor 42.

The housing 35 of the input stage is inserted in the opening 34 in the post until the pins 31 engage in the socket 43 inside the post. This socket 43 is positioned at such distance from the opening 34 that a part of the housing of the input stage, at least the cap 44, extends outside the post-part 2A and serves as a handle which can be gripped with two fingers of one hand to withdraw the input stage from the post.

In FIG. 13 there is shown a projector which is similar to that of FIG. 11. In the projection head 3 there is provided an opening 45 to receive a frame 46 which is inserted so that only a hand grip portion 47 extends out of the opening. The frame 46 consists of four bars which surround a window 55. Inside this window there is provided a socket 48 for the lamp 6. On the outer side of one of the bars defining the frame there is provided a handle or hand grip 47 which is desirably heat insulated from the frame.

In the example shown in FIGS. 14 and 15 contact pins 49 provided on the side of the frame opposite the side on which the handle 47 is affixed are insertable in a socket inside projection head 3. With this embodiment no guide rails are required although it is desirable to provide, on the outer sides on the longitudinal bars of the frame, ribs 49 which slide in guide channels provided in the projection head 3.

In the example shown in FIG. 16 the frame 46 carries not only the lamp 6 but also a reflector 50. Moreover, there is provided at least one adjustment screw 51 with which the relative positions of the reflector 50 and the lamp 6 can be adjusted. In this embodiment there are provided contacts 52 of conductive material. When the frame 46 is inserted in the projector head 3 these contacts engage counter contacts which are not visible in the drawing, to supply current to the lamp. Instead of the contacts 52, other contact surfaces can be provided on the frame 46.

In FIG. 17 there is shown an embodiment in which the frame 46 is received in channel-shaped guide rails 53 which are formed of conductive material and have spring contacts 54 in order to assure good contact connection between the rails 52 and the contacts 53 of the frame 46. If desired, only the contacts 54 can be of conductive material.

An example of a frame with two lamps 6 is illustrated in FIG. 18. In the window 55 of the frame 46 there are two sockets 48 next to one another and arranged to receive two adjacent lamps 6. Also here there is a handle 47 on that side of the frame opposite the contact pins 49. The frame is received in guide rails 53. The socket 56, in which there are electrical counter contacts for the contact pins 49 of the frame, is arranged asymmetrically with respect to the geometric axis 57 of the frame. This results in only one lamp receiving current at a time. In case of a defect in the lamp receiving current, the frame 46 is merely pulled out of the projector turned 180° about its geometric axis 57 and then again inserted in the projector head, whereby the contact pins of the undamaged lamp are inserted in the socket 56 and thereby supply the undamaged lamp with current.

In FIGS. 19 and 20 there is shown another embodiment in which the frame 46 is a cast or molded piece which has two reflectors 50 arranged respectively on opposite sides of the frame. There is a lamp 6 in front of each reflector 50. In the drawings, only one lamp 6 is seen because the other lamp is covered by the back of a reflector 50.

In the example shown in cross section in FIG. 21 the frame 46 together with two reflectors 50 are formed integrally with a body 59 as a cast or molded piece. The two lamps 6 and the reflector body 59 lying between them are not arranged side-by-side in the window 55 of the frame 46 but are behind one another.

The frames shown in FIGS. 19 to 21 are formed so that they do not have a window going through from one side of the frame to the other but rather window cavities which are closed by a reflector on the side opposite the window openings. While the frames of FIGS. 13 to 18 have only one window those of the frames shown in FIGS. 19 to 21 have two windows facing opposite sides of the frame.

Instead of the member 46 being called a "frame" it can be called an insertable lamp holder. The examples shown in FIGS. 13 to 18 can be called frame-form lamp holders while those of FIGS. 19 and 21 can be called quadraform lamp holders, with recesses in the form of hollows on opposite sides in which the sockets and lamps are accommodated and the back walls of which are formed as reflectors.

Figure 22:
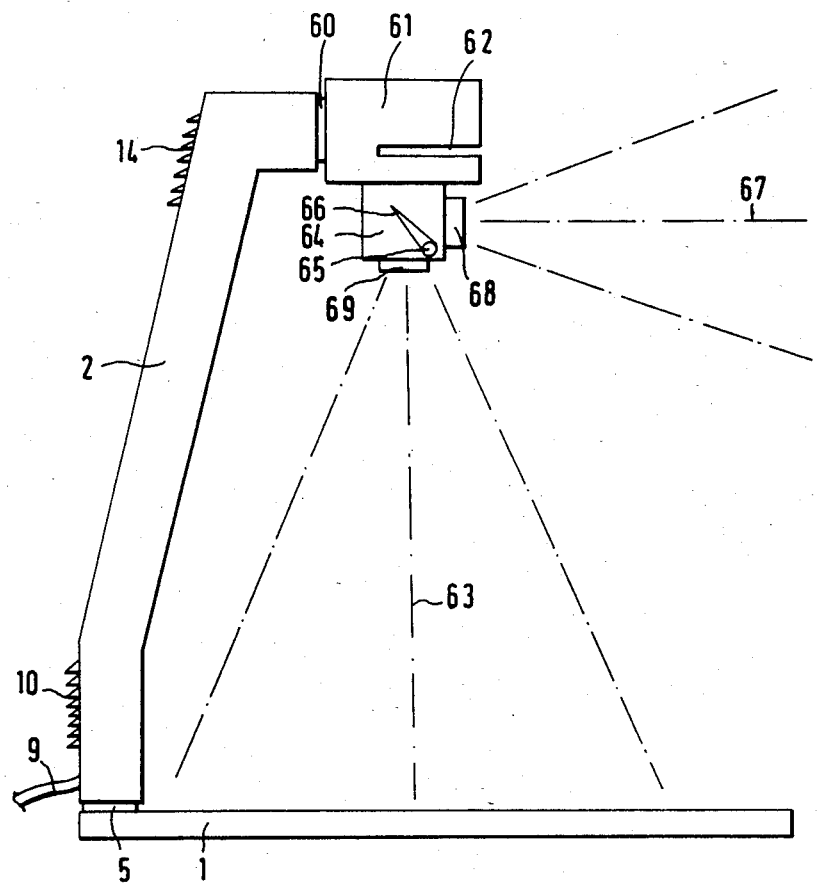
FIG. 22 is a side view of a still picture projector provided with a microfilm projector head.

In the embodiment shown in FIG. 22 a microfilm projector 61 is mounted by a quick coupling 60 on the post 2. This microfilm projector 61 comprises a housing in which a light source, an objective and a platform on which the microfilms to be projected lie. The microfilms are inserted through a slot 62 into the interior of the microfilm projector. The optical axis 63 of the objective of the microfilm projector 61 extends vertically down. It runs through an optical deflecting device 64 which is arranged in front of the objective of the microfilm projector 61. This comprises a housing in which there is a light transmitting deflection mirror which is pivotal about an axis 65 and takes approximately the position of the hand lever 66 provided for swinging the deflection mirror. With the help of this deflection device 64 a part of the light rays are projected along the optical axis 67 through the exit window 68 onto the wall. The rest of the light rays are projected through the exit window 69 onto the writing plate 1. A lecturer is thereby provided with the possibility that although he sits with his back to the projection wall he can see the projected picture on the ground plate. At the same time he can, from his seat in front of the projector and without turning his head, see his audience.

This projector can also be used as microfilm reading apparatus. If the hand lever 66 is turned in a clockwise direction to a vertical position, no light is projected through the exit windown 68 and all of the light falls only on the writing plate 1. If the user lays a sheet of paper or foil or another object to be drawn, on the base plate 1, he can write or draw on this object, for example to draw the projected contour. He can also use this reading apparatus not only to read but in many different ways.

Figure 23:
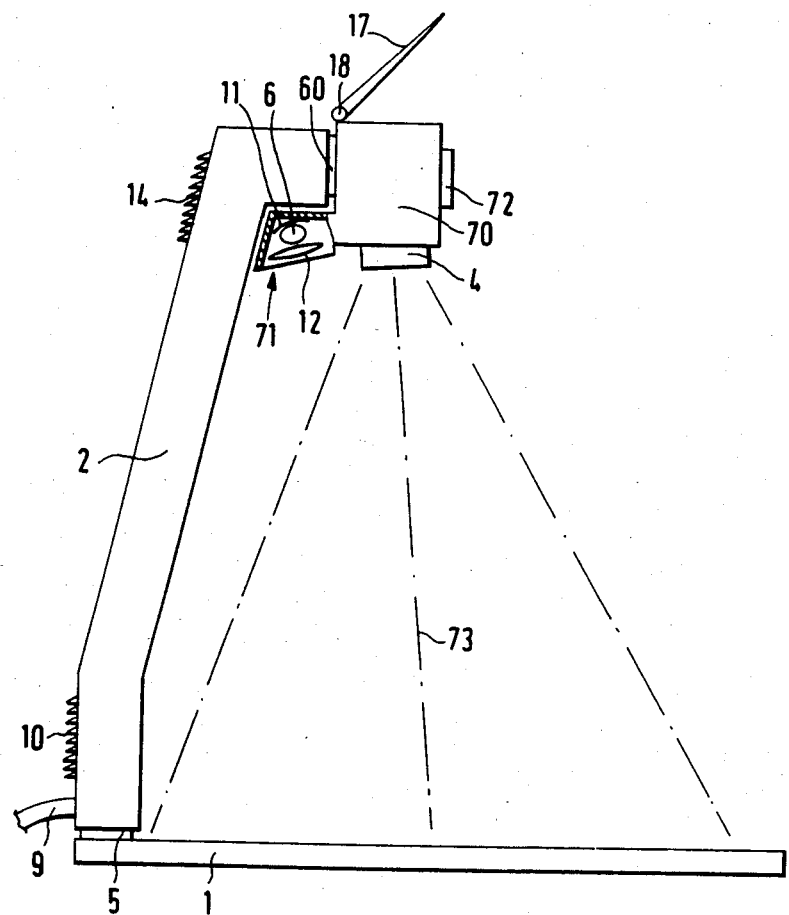
FIG. 23 is a schematic side view of a still picture projector provided with an overhead projection head.

In the embodiment shown in FIG. 23 an overhead projection head 70 is mounted on the post 2. This not only has the overhead projection objective 4 and carries on its upper side the deflection mirror 17 which is swingable about a hinge 18 but also carries in an added part 71 a light source which comprises the lamp 6, condenser 12 and reflector 11. This light source lights the writing table 1 on which is laid the original which is then projected with the aid of a Fresnel lens installed in the writing plate 1.

Figure 24:
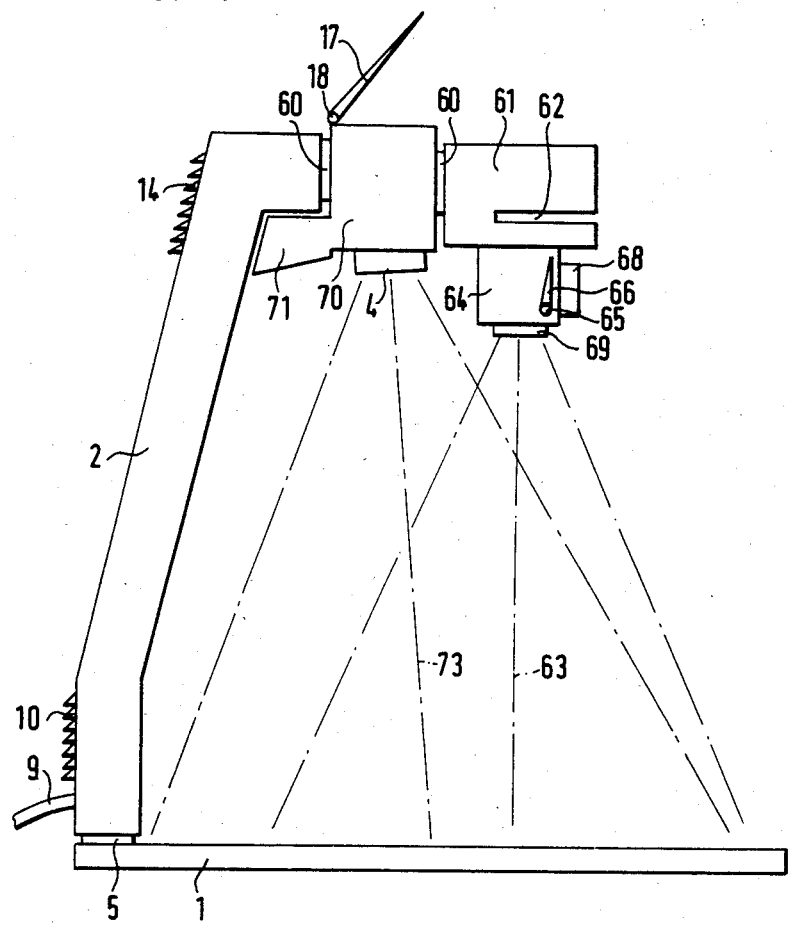
FIG. 24 is a schematic side view of a still picture projector provided with a microfilm projector head and also with an overhead projector head.

This overhead projection head 70 has on the side opposite that attached to the post 2 a further quick coupling 72 like that used for mounting the projection head on the post 2. With this further quick coupling part 72 a micro film projection head 61 can be coupled to the overhead projection head 70 mounted on the post 2 as shown in FIG. 24. Thus the post 2 carries the overhead projection head 70 as well as also the microfilm projection head 61 attached thereto. For the projection the procedure is for example that the hand lever 66 of the microfilm projector is brought to a vertical position so that all of the light of the microfilm projector exits from the exit window 69 and falls on the base plate 1 while no light exits through the exit window 68. In this manner the greater part of the Fresnel lens in the base plate 1 is illuminated by the microfilm projector 1 and the light energy reflected from the reflecting Fresnel lens is transmitted along the optical axis 73 into the overhead objective 4 and by means of the deflection mirror 17 is thrown on the wall. In this manner the projectionist is given the possibility by laying a transparent overhead foil on the base plate 1 to write or draw on the projected microfilm picture. The microfilm thereby remains free of the writing. Only an empty overhead projection foil is provided with the writing and drawing. In this procedure a lecturer need not turn his head when he wishes to look at the audience.

Figure 25:
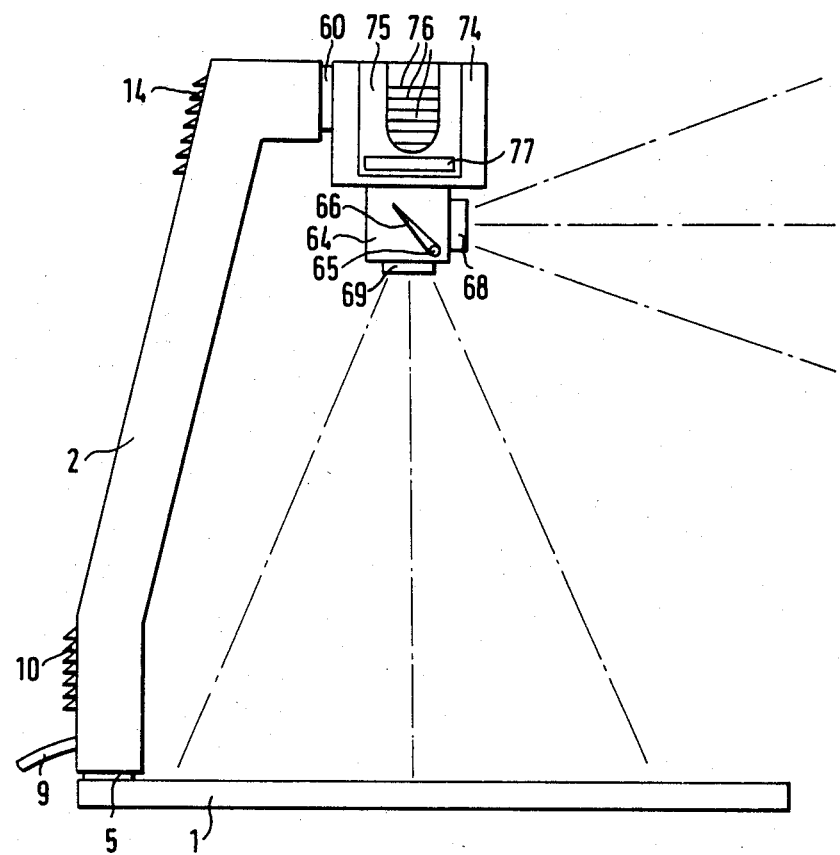
FIG. 25 is a schematic side view of a still picture projector provided with a slide projector head.

In FIG. 25 there is shown an embodiment in which a slide projector 74 is mounted on the post 2 by means of a quick coupling 60. This has on the side facing the spectators a magazine 75 for slides 76 which by means of a slide plate 77 can be pushed into the slide projector 74. In this slide projector head adjacent the picture frame on which the slides 76 are fed by the slide plate 77 there are accommodated a light source and an objective (not shown). In front of this objective there is arranged a deflecting device 64 like that arranged before the microfilm projector 61 in FIG. 24. Through the exit window 68 the projected picture is projected on the wall while through the exit window 69 the picture falls on the base plate 1 of the projector. The operator can follow the same procedure as with the microfilm projector 61 he can project the picture on the wall and simultaneously on the base plate 1. He can also use the apparatus as a slide viewer without projecting the picture on the wall when he places the hand lever 66 in a vertical position.

Figure 26:
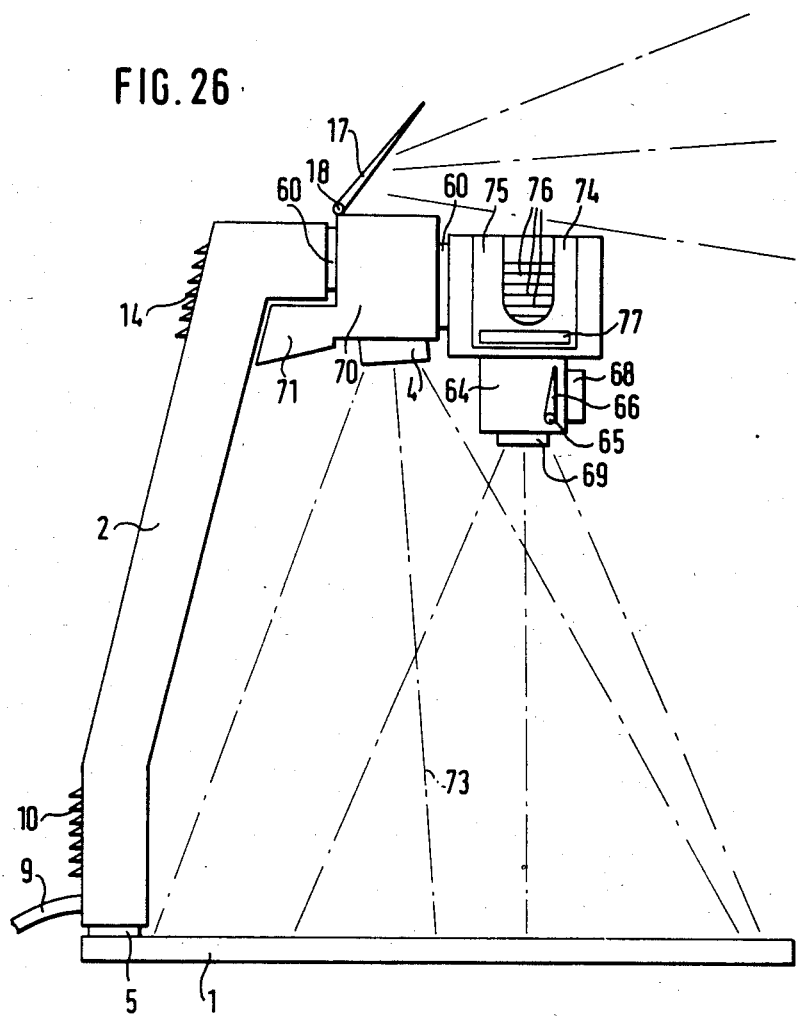
FIG. 26 is a schematic side view of a still picture projector provided with a slide projector head and an overhead projector head.
Figure 27:
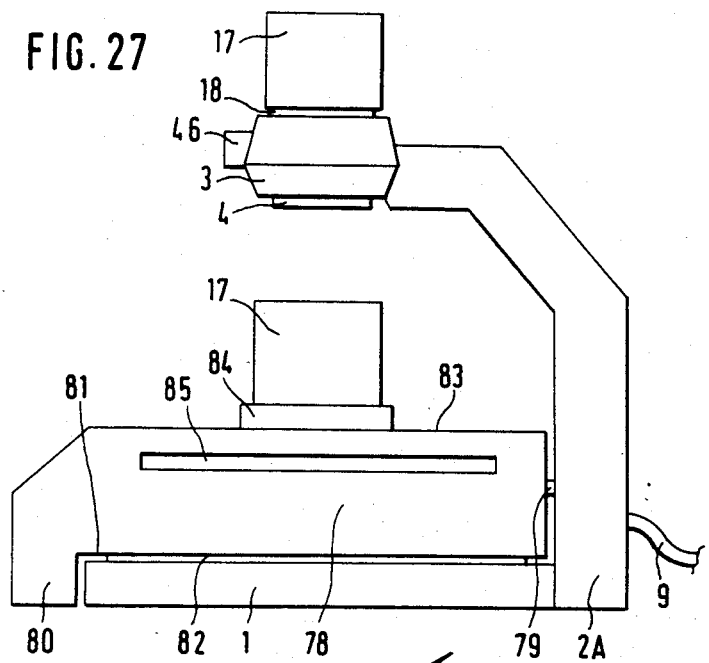
FIG. 27 is a schematic front view of an overhead projector with a slide projector insertable laterally on the carrying arm.
Figure 28:
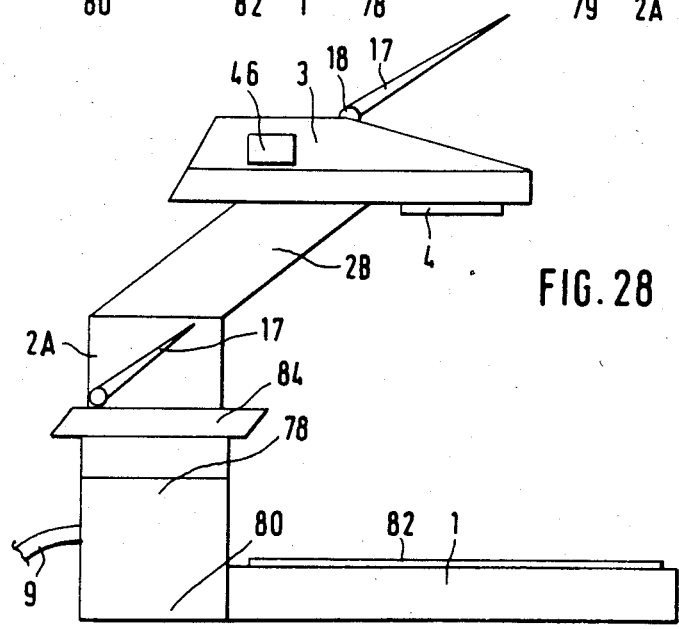
FIG. 28 is a side view of the projector of FIG. 27.

The lecturer also has the possibility of using the slide projection head 74 together with the overhead projector head 4 at the same time as is illustrated in FIG. 26. In this case the lecturer turns off the light source 71 and works with the overhead projector with the light delivered by the slide projector head 74 and thrown in its entirety on the ground plate 71 after placing the mirror in the vertical position by means of the hand lever 66. As the quick coupling 60, various types of couplings can be used such as a baonet coupling, screw thread, interupted screw thread and the like. FIGS. 27 and 28 show an assembled overhead projector of which a power supply unit in the post 2 supplies power not only to a projection head 3 mounted at the top of the post but also to a slide projector 78 which is on or adjacent the base plate 1. The slide projector 78 is of plug-in construction. It has two contact pins 79 which are insertable in openings in the post. The slide projector is of elongate construction and has at the end opposite the contact pins 79 a downwardly extending foot portion 80 which rests on the surface supporting the projector. However, this foot is not necessarily required as the slide projector can rest with its lower surface 81 on the upper surface of the base plate 1 when this is extended beyond the writing surface 82. On its upper surface 83 the slide projector has an added part 84 accommodating a projection objective and having a hinged reflection mirror 17 mounted on its upper surface. The added part 84 is preferably rotatably mounted so that the mirror can be turned in different directions. In the long side of the housing of the slide projector 78 there is provided a slit 85 to receive the slides that are to be projected.

Figure 29:
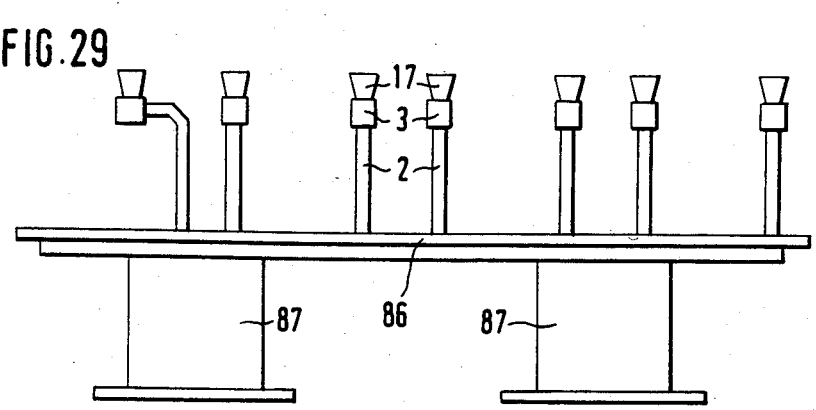
FIG. 29 is a schematic side view of a conference table provided with overhead projectors.
Figure 30:
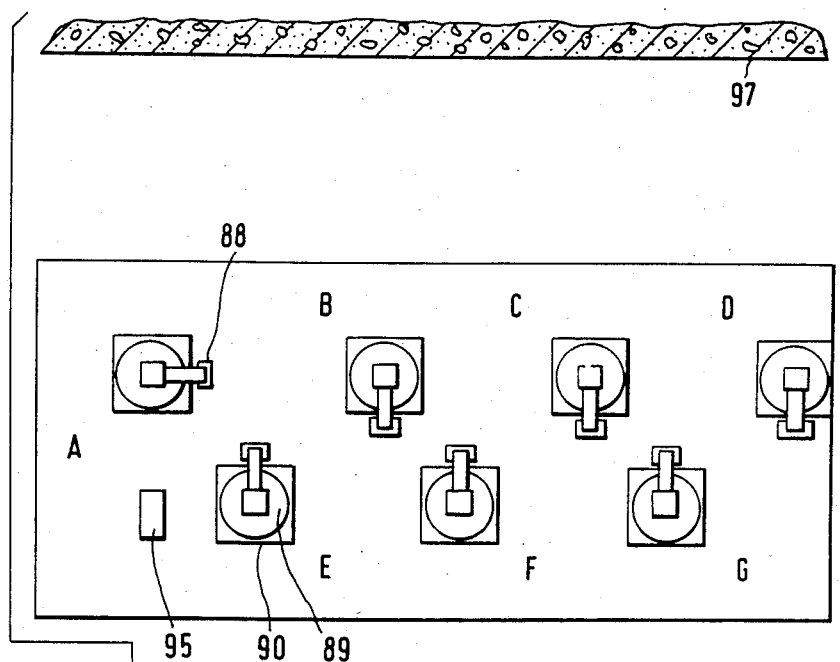
FIG. 30 is a plan of the conference table with an overhead projector provided at each work place.
Figure 31:
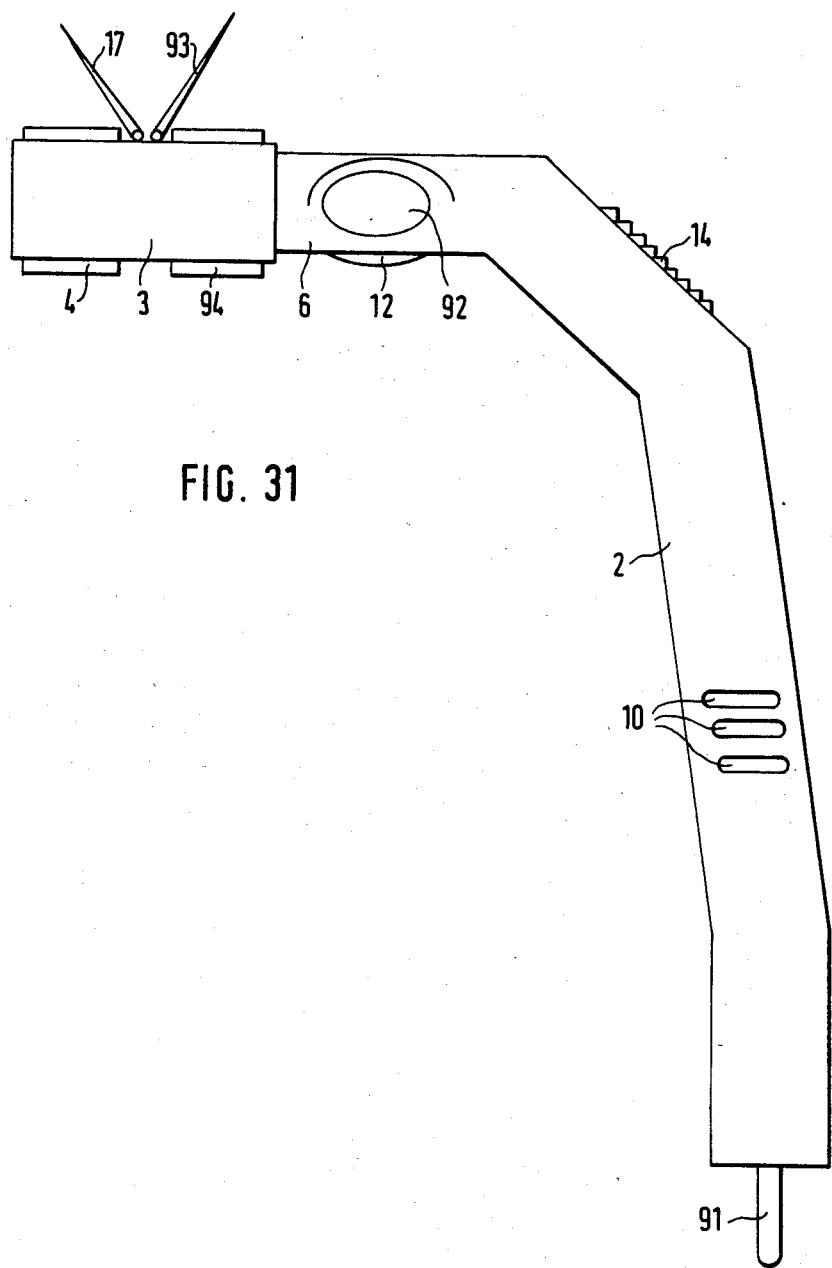
FIG. 31 is a side view of a stand with two light sources and two objectives.

FIGS. 29 to 31 illustrate the use of overhead projectors in accordance with the invention on a conference table. The table top 86 of the conference table is supported on two feet 87. In the upper surface of the table top 86 there are inset holders 88 which can be covered by hinged protective covers. In closed position, the upper surfaces of these protective covers are flesh with the upper surface of the table top. The post 2 of an overhead projector is insertable in each of the holders 88. In the table top adjacent the holders 88 there are recesses in which plates 90 containing Fresnel lens 89 are inserted.

These plates 90 have an upper surface which is formed either by the flat side of the Fresnel lens 89 or by an additional writing plate. The opposite side of the plate 90 preferably has a surface which is of the same material as the upper surface of the table top. If a post 2 with an overhead projection objective 4 is inserted in a holder 88, an original can be projected by episcopic projection directly from the table top surface. For projection by the diascopic process the plate 90 is laid in the recess so that the writing face i.e. the upper face of the Fresnel lens 89 lies in plane of the table top. If the post is removed from the holder 88, the plate 90 can be turned over so that its underside is up in order to present a uniform appearance with the table top surface at this position.

The holder 88 preferably has inner electrical contacts connected with a power supply line. Contact pins 91 on the lower ends of the post 2 engage the contacts provided in the holder 88 to supply power to the projector. The side faces of the holder 88 are so formed that they clamp the lower portions of the post 2 and hold it firmly when the post is inserted into the holder.

The post 2 preferably carries two objective lens 4 and 94. Above these objectives 4,94 there are arranged hinged deflection mirrors 17,93 with which the picture of the respective objective is projected on a wall. As the objectives 4,94 are arranged directly adjacent one another they receive the same picture namely that of the original placed on the plate 90. As the mirrors 17 and 93 are aimed in opposite directions, they project the picture on two opposite walls. Hence if persons are seated on opposite sides of the conference table all of them can see one or the other projected picture without turning his head.

In the upper horizontal portion of the post 2 there is provided a light source 6. This has two lens namely a lens 12 which is directed toward the plate 90 and a lens 92 which is directed on a work place surface next to the plate 20 in order to illuminate the work place.

In FIGS. 29 and 30 there is shown a rectangular conference table with a work place A for the chairman and work places B to G for the other members. The work place for the chairmen is provided with a controlled desk 95. With overhead projectors as illustrated in FIG. 31 pictures are projected on walls 96,97 on both sides of the conference table.

What I claim is:

1. An overhead projector comprising a base, a hollow post extending up from said base and comprising a lower approximately vertical portion and an upper approximate horizontal portion, a projector head on said upper portion of said post and comprising an objective lens and a deflection mirror, a light source in said upper portion of said post adjacent said projector head, a power supply unit in a lower portion of said hollow post and supplying power for said light source, a motor driven ventilator in an intermediate portion of said hollow post between said power supply unit and said light source, said power supply unit supplying power also to said ventilator, an air outlet opening in said post adjacent said ventilator for discharge of air from said ventilator, a first air inlet in said lower portion of said post below said power supply unit for admitting air to cool said power supply unit and a second air inlet in said upper portion of said post adjacent said light source for admitting air to cool said light source, air from said first and second inlets being drawn over said power supply unit and said light source respectively by said ventilator and discharged through said outlet opening.

2. An overhead projector according to claim 1, in which said post is removably mounted on said base by a plug and socket connection.

3. An overhead projector according to claim 2, in which said base comprises a reference table having a plurality of sockets in which said post can selectively be plugged.

4. An overhead projector according to claim 1, in which said base comprising a writing plate with a relecting Fresnel lens set therein.

5. An overhead projector according to claim 1, in which said lower approximately vertical portion of said post is telescopically adjustable to vary the distance of said projecting head from the base.

6. An overhead projector according to claim 1, further comprising a transparency projector removably resting on said base and plugged into a power outlet in a lower portion of said post to be supplied with power from said power supply unit in said post.

7. An overhead projector according to claim 1, in which said intermediate portion of said post housing said ventilator is inclined at obtuse angles to said lower portion and upper portion of said post.

8. An overhead projector according to claim 7, in which said air outlet opening is in the outer side of said intermediate post portion.

9. An overhead projector comprising a base, a hollow post extending up from said base, a projector head on an upper portion of said post and comprising a light source, an objective lens, and a deflection mirror, a power supply unit in a lower portion of said hollow post and supplying power for said light source, said power supply unit including an input stage in a housing which is pluggable into a socket in said post, a motor driven ventilator in said hollow post between said power supply unit and said light source, said power supply unit supplying power also to said ventilator, an air outlet opening in said post for discharge of air from said ventilator and air inlets for admitting air to cool said power supply unit and said light source, said air being drawn over said power supply unit and said light source respectively by said ventilator and discharged through said outlet opening.

10. An overhead projector according to claim 9, in which said input stage housing is cylindrical and has a portion projecting from said post and comprising a hand grip for removal of said input stage from and insertion into said socket.

11. An overhead projector according to claim 9, in which said input stage comprises a resistance, fuse, indicator lamp and indicator lamp control circuitry.

12. An overhead projector according to claim 8, in which said upper portion is detachable from said lower portion of said post and in which said input stage of said power supply unit is insertable into an opening in the upper end of said lower post portion.

13. An overhead projector according to claim 12, in which there is a window in said post for viewing said input stage.

14. An overhead projector comprising a base, a hollow post extending up from said base, a projector head on an upper portion of said post and comprising a light source, an objective lens, and a deflection mirror, a power supply unit in a lower portion of said hollow post and supplying power for said light source, a motor driven ventilator in said hollow post between said power supply unit and said light source, said power supply unit supplying power also to said ventilator, an air outlet opening in said post for discharge of air from said ventilator and air inlets for admitting air to cool said power supply unit and said light source, said air being drawn over said power supply unit and said light source by said ventilator and discharged through said outlet opening, said projector head having a power supply receptacle and in which a transparency projector is mounted on said projector head by being plugged into said power supply receptacle, said transparency projector comprising a light source, a holder for a transparency to be projected and a lens directed through an exit opening toward said base, whereby an image projected by said transparency projector on the base is re-projected by said projector head onto a vertical surface.

15. An overhead projector according to claim 14, in which said transparency projector has a second exit opening directed approximately horizontally and deflection means for projecting an image from a transparency simultaneously through both of said exit openings.

16. An overhead projector according to claim 15, in which said deflection means comprises a translucent mirror pivotally mounted for movement between a position in which it intercepts light rays from said transparency and directs said rays partially out through said second exit opening and a position in which it does not intercept said light rays.

17. An overhead projector system comprising a conference table having a table top, a plurality of sockets in said table top with electrical contacts in each socket, a plurality of overhead projectors each comprising a hollow post having a lower end which fits in a socket in said table top so that said post extends up from said table top, a projector head on an upper portion of said post and comprising a light source and an objective lens, a power supply unit in said post supplying power to said light source, and electrical contacts at said lower end of said post, said contacts being connected with said power supply unit and adapted to engage said contacts in said socket when said post is plugged into said socket.

18. An overhead projector system according to claim 17 in which adjacent each of said sockets in said table top there is a writing surface comprising a reflecting Fresnel lens set in a recess in the table top and having a surface flush with the upper surface of said table top.

19. An overhead projector system according to claim 18, in which said Fresnel lens has a back face of the same appearance as the surface of said table top, said Fresnel lens being reversible in said recess to a position in which said back face of said Fresnel lens is flush with the upper surface of said table top.

20. An overhead projector system according to claim 18, in which said light source comprises means for directing light onto said Fresnel lens and means for directing light onto a work place on said table top adjacent said Fresnel lens.

21. An overhead projector system according to claim 17, in which said projection head comprises two objective lens and two deflection mirrors associated respectively with said lens, said mirrors being positioned to project light rays in different directions, whereby an image of an original to be projected is projected simultaneouly on two different vertical surfaces disposed in the respective paths of said light rays.

22. An overhead projector comprising a base, a hollow support comprising three sections disposed at obtuse angles to one another, namely a lower approximately vertical section extending up from said base, an upper approximately horizontal section above the base and an intermediate inclined section connecting said upper section with said lower section, an objective lens holder with a lens therein mounted on a free end of said upper section, a light source in said upper section, a power supply unit in said lower section and a power driven ventilator in said intermediate section; said hollow support having an air outlet opening in said intermediate section of said hollow support adjacent said ventilator for discharge of air from said ventilator, a first air inlet in said lower section of said hollow support below said power supply unit for admitting air to cool said power supply unit and a second air inlet in said upper section of said hollow support adjacent said light source for admitting air to cool said light source, air from said first and second inlets being drawn over said power supply unit and said light source respectively by said ventilator and discharged through said outlet opening.

23. An overhead projector comprising a base, a hollow post extending up from said base, a projector head on an upper portion of said post and comprising a housing having an opening in a side wall thereof, a lamp holder comprising a rectangular frame having a handle portion at one side and electrical plug-in connections at an opposite side, said frame being removable insertable through said opening into said projector head, a lamp socket in said frame and a lamp in said socket, said lamp holder being removable from said projector head for changing said lamp, an objective lens and a deflection mirror mounted on said housing, a power supply unit in a lower portion of said hollow post and supplying power for said lamp, a motor driven ventilator in said hollow post between said power supply unit and said projector head, said power supply unit also supplying power to said ventilator, an air outlet opening in said post for discharge of air from said ventilator and air inlets for admitting air to cool said power supply and said lamp, said air being drawn in over said power supply unit and said lamp by said ventilator and discharged through said outlet opening.

24. An overhead projector according to claim 23, in which said light source further comprises a reflector in said lamp holder.

25. An overhead projector comprising a base, a hollow post extending up from said base, a projector head on an upper portion of said post and comprising a light source, an objective lens and a deflecting mirror, said light source comprising a lamp holder removably insertable in said projector head, two lamp sockets in said lamp holder and two lamps in said sockets, and electrical contacts disposed asymmetrically on said lamp holder engageable with counter contacts in said projector housing so as to light only one of said lamps at a time, a power supply unit in a lower portion of said hollow post and supplying power for said light source, a motor driven ventilator in said hollow post between said power supply unit and said light source, said power supply unit supplying power to said ventilator, an air outlet opening in said post for discharge of air from said ventilator and air inlets for admitting air to cool said power supply unit and said light source, said air being drawn over said power supply unit and said light source by said ventilator and discharged through said outlet opening.

26. An overhead projector according to claim 25, in which said light source further comprises reflectors for said lamp integral with said lamp holder.

27. An overhead projector according to claim 26, in which said lamps are disposed side by side and said reflectors are respectively at opposite sides of said lamp holder.

28. An overhead projector according to claim 26, in which said lamps are disposed at opposite sides of said lamp holder and said reflectors are disposed between said lamps.

* * * * *